United States Patent [19]
Karpenko

[11] 4,410,007
[45] Oct. 18, 1983

[54] SOFT SEAL INSTALLATION FOR FEED WATER CHECK VALVE

[75] Inventor: Anatole N. Karpenko, San Francisco, Calif.

[73] Assignee: Anchor/Darling Valve Company, San Mateo, Calif.

[21] Appl. No.: 351,984

[22] Filed: Feb. 24, 1982

Related U.S. Application Data

[63] Continuation-in-part of Ser. No. 176,846, Aug. 11, 1980, abandoned.

[51] Int. Cl.³ .............................................. F16K 15/03
[52] U.S. Cl. .............................. 137/516.29; 137/527.8; 251/175
[58] Field of Search ................. 137/527, 527.2, 527.4, 137/527.8, 516.29; 251/173, 298, 175

[56] References Cited

U.S. PATENT DOCUMENTS

| 612,890 | 10/1898 | Wood | 251/175 |
|---|---|---|---|
| 2,556,904 | 6/1951 | Cline | 137/516.29 |
| 3,075,547 | 1/1963 | Scaramucci | 137/516.29 |
| 3,658,292 | 4/1972 | Takigawa | 251/173 X |
| 3,837,616 | 9/1974 | Scanderberg | 251/175 X |
| 4,083,529 | 4/1978 | Santy | 251/175 |
| 4,248,404 | 2/1981 | Goldman | 251/175 X |
| 4,258,925 | 3/1981 | Guyton | 137/527 |

FOREIGN PATENT DOCUMENTS

| 2829400 | 1/1979 | Fed. Rep. of Germany | 251/175 |
|---|---|---|---|
| 602872 | 3/1960 | Italy | 251/175 |

*Primary Examiner*—Robert G. Nilson
*Attorney, Agent, or Firm*—Robert G. Slick

[57] ABSTRACT

A feed water check valve of the swing type is provided with a soft seal backup to the main element to ensure sealing of the valve plug so that no leakage occurs during testing or when full closure is required as in an emergency.

1 Claim, 2 Drawing Figures

SOFT SEAL INSTALLATION FOR FEED WATER CHECK VALVE

REFERENCE TO RELATED APPLICATION

This application is a continuation-in-part of my application Ser. No. 176,846, filed Aug. 11, 1980, now abandoned.

SUMMARY OF THE INVENTION

In general it is the broad object of the present invention to provide a modification of a check valve such that a structure is provided which is leakproof and which permits of checking of that valve for any leakage.

In nuclear plant installations, it is important that the system be leakproof, yet be very fast acting. Such valves shut with a tremendous force and no resilient packing, such as a rubber seal, could stand up to such a force. Accordingly, such valves are made with mating sealing surface of a hard metal such as Stellite ® to withstand the severe shock of closing. However, there is a disadvantage with valves having hard metal seals in that it is difficult to make such valves leakproof, since a small amount of foreign material, scoring or corrosion on a sealing surface, will cause a leak.

It has been proposed to remedy this by supplying a backup gasket of rubber or some similar soft material which will not leak even if there is some foreign material on the valve seat. The problem with such gaskets or seals is that they soon take a "set" and become unreliable.

According to the present invention, a backup seal is provided of a flexible material which has a "U" shape in cross section, with means for introducing fluid within the "U" from the high pressure side of the valve, thus expanding the flexible material into contact with the valve seat and forming a perfect seal, even in the presence of foreign matter or corrosion. Since the seal is expanded under pressure, it will not take a set.

It is thus the primary object of the present invention to provide a backup flexible seal for a check valve having a hard facing wherein the flexible seal will not take a permanent set.

DESCRIPTION OF THE PREFERRED EMBODIMENT

Figure 1:
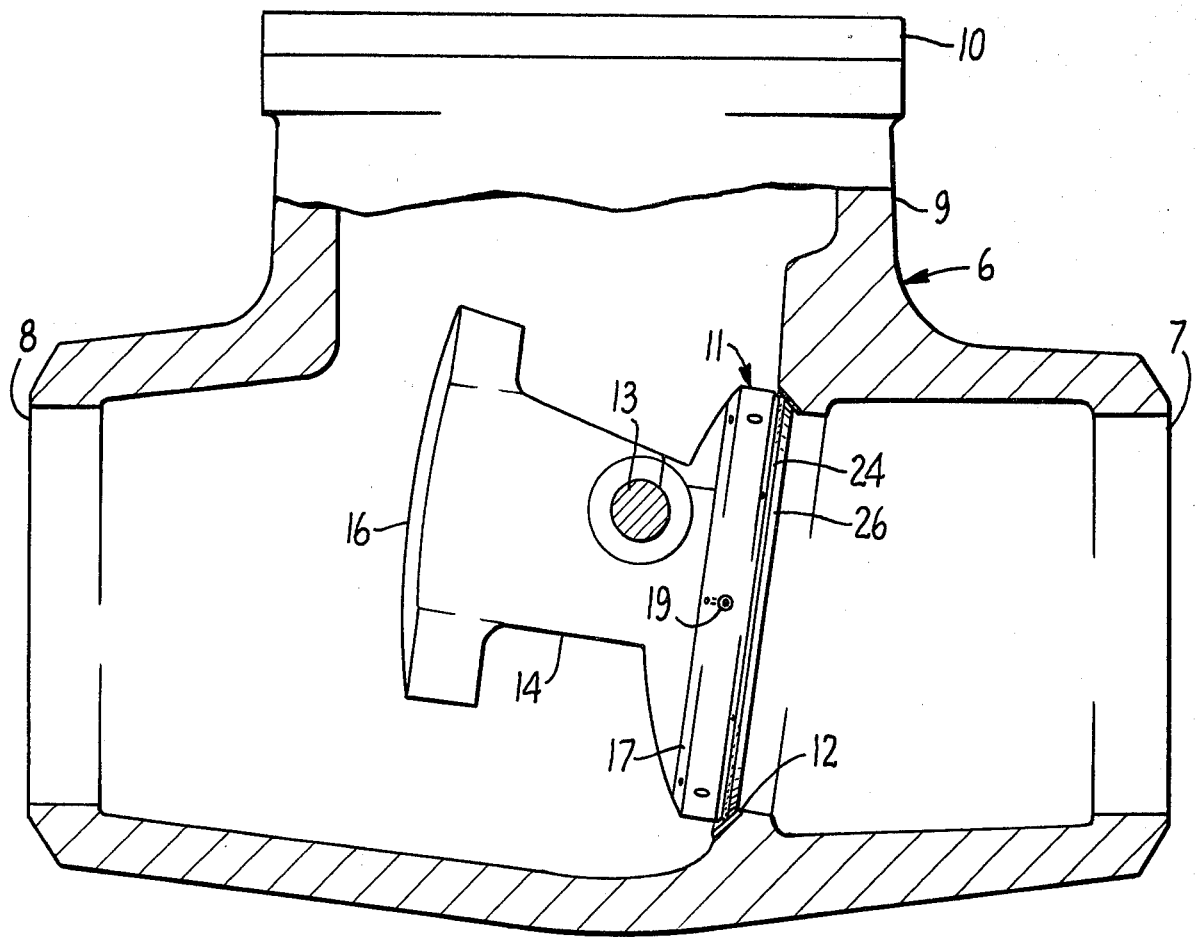
FIG. 1 is a side elevation partly in section through a check valve providing the best mode of practicing the present invention.

Referring to the drawing, I have shown the valve body generally at 6 having opposite ports 7 and 8. The body of the valve includes an upstanding circular portion 9 closed by a plate 10 to permit manual access to the presently described swing check valve. The swing check valve includes a valve portion 11 having a conical member 26 adapted to seat upon the surface 12; both 12 and 26 are faced with a hard surface material such as Stellite ®. The valve portion 11 is swingable about a hinge pin 13 provided centrally of the valve which is generally indicated at 14. The valve 14 includes a counterweight portion 16 opposite to the valve portion 11. The principal sealing action takes place between the mating hard surfaces 12 and 26.

Figure 2:
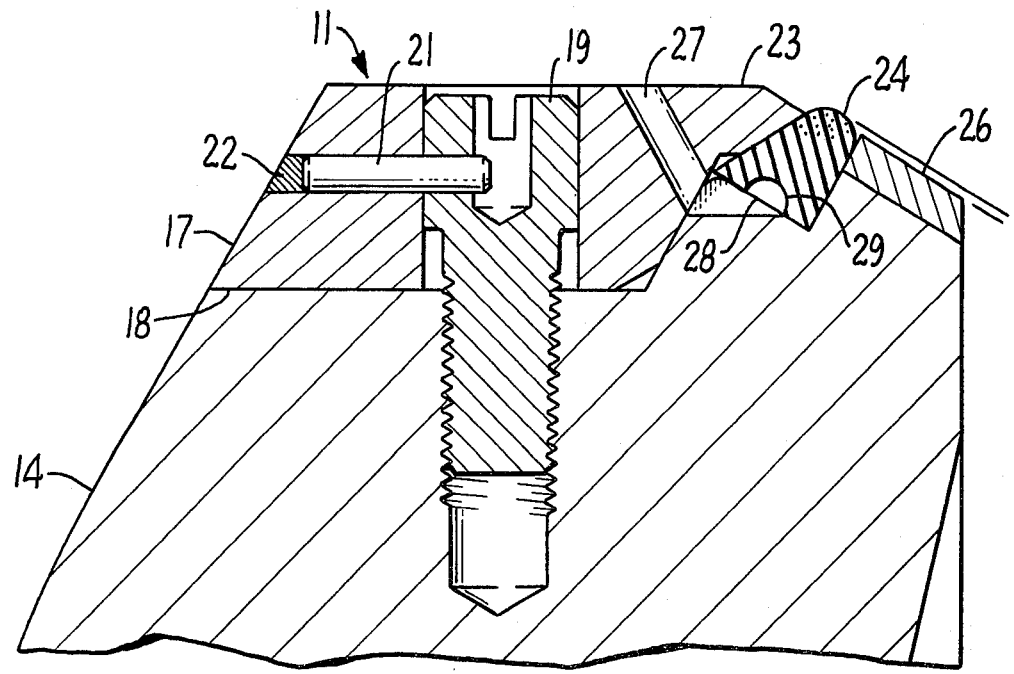
FIG. 2 is a fragmentary view illustrating the valve construction, particularly the novel sealing means employed.

A circular retaining ring 17 is mounted upon recessed portion 18 of the valve 11 and is held in place by six spaced screws 19 provided about the valve body, each of which extends through the ring 17 and is fixed in position by a pin 21 and by welding 22. The retaining ring 17 includes a forwardly extending portion 23 adapted to retain an annular flexible sealing element 24 in position to the channel between the Stellite ® facing 26 and the retaining ring 17. As is shown in FIG. 2 the flexible sealing element 24 is in the form of a "U" when viewed in cross section with the sides of the legs of the U resting on either side of the channel and with the bottoms of the legs resting on the bottom 28 of the channel. The hollow interior 29 of the resilient U-shaped member 24 is in fluid communication with the passages 27 and 28 so that pressure within the passages 27, from reverse fluid pressure in the valve, will expand the flexible member and press the rounded outer surface into contact with the valve seat 12.

Normally, the flow in the check valve is from port 7 to port 8, that is from the righthand side of FIG. 1 to the lefthand side of FIG. 1; the flow in that position of the check valve is free flow. When the fluid flow is reversed, the counterweight 16 causes the swing check valve to swing about hinge pin 13 to the closed position as appears in FIG. 1. This brings the hard faced surfaces 12 and 26 into sealing engagement, forming the primary seal. Further, with the flow reversed, fluid on the normally upstream side of the swing check valve enters through passages 27 and expands the flexible sealing annulus 24 to also engage the Stellite ® face 12 on the valve body in sealing engagement to form a secondary seal so that flow through the swing check valve is not permitted and flow is effectively cut off from port 8 to port 7, even should there be some slight leakage of the primary seal between 12 and 26. If any flow is observed, it is an instant telltale that the check valve is not functioning as it should and instant inspection and possible repair are in order.

In use, when it is desired to test the check valve for tightness, and to determine if there is any leakage past the feed water passage check valve when the latter is in the closed position, a suitable pressure is applied to force the hard metal surfaces 12 and 26 together and to expand the flexible sealing element 24 into engagement with the Stellite ® face 12 on the valve body, and then ascertain if there is any leakage past flexible sealing element 24. If any such leakage is observed, then it is instantly apparent that the valve must be repaired and the sealing surfaces realigned to assure that the feed water does not bypass the check valve.

I claim:

1. In a swinging check valve having a valve portion swingable between an open and a closed position, the check valve including a valve body having an annular valve seat, said valve body and said valve portion having hard metal conical complementary facings adapted to form the primary valve seal when brought together, the improvement comprising a backup system including an annular flexible valve sealing element displaced outwardly from said primary valve seal on the valve portion to engage the annular valve seat on the valve body to close the valve, the valve portion including an annular groove extending about its circumference and having mounted therein said flexible annular valve sealing element, said element having a "U" shape when viewed in cross section, with a rounded outer surface adapted to contact said valve seat with the legs of the "U" in contact with the bottom and sides of annular groove and with the hollow interior of the "U" forming a chamber with the bottom of the groove constituting one side thereof and being cooperatively adjacent to the annular valve seat on the valve body when the swing check valve is in its closed position, a passage leading from said chamber to the opposite side of the valve portion whereby the chamber is in communication with fluid under pressure from within the valve body to expand the flexible sealing element outward into sealing engagement with the annular valve seat.

* * * * *